United States Patent Office 3,746,653
Patented July 17, 1973

3,746,653
JET DYEING FOAM CONTROL
John W. Churchfield, Delran, N.J., assignor to Dow Corning Corporation, Midland, Mich.
No Drawing. Filed May 15, 1972, Ser. No. 253,616
Int. Cl. B01d *17/00*
U.S. Cl. 252—321                 10 Claims

ABSTRACT OF THE DISCLOSURE

A foam control agent particularly useful in jet dyeing of textiles is disclosed. The composition consists essentially of (1) a siloxane glycol copolymer, (2) a liquid polydimethylsiloxane, (3) silica, (4) a siloxane resin, and (5) a siloxane copolymer.

---

The advent of a new process for dyeing textiles, known as jet dyeing, has become widely accepted. This process involves high temperature (250°–270° F.), high pressure, and violent agitation. The dye solution is forced through the textile by means of a jet port, hence the name "jet dyeing." Conventional silicone foam control agents used heretofore in textile dyeing processes are severely broken down in the jet dyeing process due to the high temperature and shear conditions present in this process. This break down results in insoluble polydimethylsiloxane plating out on the inside of the dye beck and this can cause severe spotting and shading problems on the textile. Therefore, the textile industry has become wary of using silicone foam control agents in the jet dyeing process in spite of foam problems which exist.

It has now been found that the composition of this invention cannot only be used in conventional foam control applications but also can be used in textile jet dyeing processes with virtually no problems as encountered with the heretofore available products.

This invention relates to a composition which consists essentially of (1) 40 to 98.94 percent by weight of a siloxane glycol copolymer selected from the group consisting of siloxane glycol copolymers having the general formulae (a) $R_aSi\{(OSiMe_2)_n(OSiMeG)_bOSiMe_2G\}_{4-a}$,
(b) $R_aSi\{(OSiMe_2)_n(OSiMeG)_cOSiMe_3\}_{4-a}$,
(c) $GMe_2Si(OSiMe_2)_n(OSiMeG)_bOSiMe_2G$, and
(d) $Me_3Si(OSiMe_2)_n(OSiMeG)_cOSiMe_3$ in which formulae R is a hydrocarbon radical free of aliphatic unsaturation and contains from 1 to 10 carbon atoms, Me is a methyl radical, G is a radical of the structure —D(OR')$_m$A wherein D is an alkylene radical containing from 1 to 30 carbon atoms, R' is an alkylene radical containing from 2 to 10 carbon atoms, $m$ has a value of at least 1, and A is a capping group, $a$ has a value of 0 or 1, $n$ has a value of at least 1, $b$ has a value of 0 to 50, and $c$ has a value of 1 to 50, (2) 0.50 to 50 percent by weight of a liquid polydimethylsiloxane having a viscosity of at least 20 centistokes at 25° C., (3) 0.05 to 5 percent by weight of silica, (4) 0.01 to 0.40 percent by weight of a siloxane resin consisting essentially of $SiO_2$ units and $(CH_3)_3SiO_{1/2}$ units, the ratio of the $SiO_2$ units to the $(CH_3)SiO_{1/2}$ units being in the range of 1:0.4 to 1:1.2, and (5) 0.50 to 10 percent by weight of a siloxane copolymer selected from the group consisting of (i) copolymers consisting essentially of $SiO_2$ units, $(CH_3)_3SiO_{1/2}$ units and $Q(CH_3)_2SiO_{1/2}$ units wherein Q represents a polyoxypropylene polymer or a polyoxypropylene-polyoxyethylene copolymer having molecular weights in the range of 2000 to 6000, Q being attached to the silicon atom via a silicon-carbon bond, the ratio of the $SiO_2$ units to the total $(CH_3)_3SiO_{1/2}$ and $Q(CH_3)_2SiO_{1/2}$ units being in the range of 1:0.4 to 1:1.2, and (ii) copolymers which are the reaction products derived from heating a mixture of a siloxane copolymer consisting essentially of $SiO_2$ units and $(CH_3)_3SiO_{1/2}$ units in which the ratio of $SiO_2$ units to the $(CH_3)_3SiO_{1/2}$ units is in the range of 1:0.4 to 1:1.2, and a hydroxyl containing polyoxypropylene polymer or a hydroxyl containing polyoxypropylene-polyoxyethylene copolymer having molecular weights in the range of 2000 to 6000.

This invention also relates to a method of controlling foam which comprises using the above composition as the foam control agent.

This invention further is directed to a process for controlling foam in a textile dyeing application utilizing the above composition as the foam control agent.

This invention is still further directed to the control of foam in a jet dyeing process wherein the above composition is employed as the foam control agent.

The first essential ingredient of the composition of this invention is a siloxane glycol copolymer having the formulae set forth above. This ingredient is present in an amount of from 40 to 98.94 percent by weight. It can consist of a single such siloxane glycol copolymer or a mixture thereof. These copolymers are well known commercially available materials and have been described numerous places in the literature.

In the above formulae R can be any hydrocarbon radical free of aliphatic unsaturation which contains from 1 to 10 carbon atoms such as a methyl, ethyl, propyl, isopropyl, butyl, hexyl, decyl, phenyl, tolyl, benzyl, xylyl, methylcyclohexyl, cyclohexyl, cyclopentyl, β-phenylpropyl or a β-phenylethyl radical.

Specific examples of alkylene radical D which links the glycol portion of G to the silicon atom are the methylene, ethylene, propylene, isopropylene, butylene, octylene, decylene, octadecylene and the myricylene radicals. Preferably D contains from 1 to 18 carbon atoms.

R' in the above formulae is any alkylene radical containing from 2 to 10 carbon atoms. Thus R' can be an ethylene, propylene, isopropylene, butylene, hexylene, octylene or a decylene radical. Most preferably R' contains from 2 to 4 carbon atoms. It is noted that R' can be derived from a single glycol or a combination of glycols. That is to say, for example, OR' can be ethylene oxide units, propylene oxide units or butylene oxide units only, or OR' can be combinations of such units.

The symbol $m$ which defines the number of OR' units in the glycol portion of the molecule can have a value as low as 1 and can range up to 1000 or more. Generally, $m$ will have an average value of 10 to 100.

The glycol or polyoxyalkylene unit is terminated or capped by the A group. The specific nature of this group is not known to be critical for purposes of this invention. Thus the glycol can be capped by a hydroxyl group (A is a hydrogen atom), by an ether group (A is a monovalent hydrocarbon group such as a methyl, butyl, vinyl or phenyl radical), by a carboxyl radical, by the salt or ester of a carboxyl radical, by a carbonate ester group, or by an isocyanate group.

The symbol $n$ which defines the number of dimethylsiloxane units in the molecules can have a value of at least 1 and can range up to 1500 or more. It is believed that the number of dimethylsiloxane units in the molecule in relationship to the glycol containing G units should be at least 10:1 for the most satisfactory results to be obtained. The upper ratio of $OSiMe_2$ units to G containing units can be 50:1 or more.

The second essential ingredient of the composition of this invention is a liquid polydimethylsiloxane having a viscosity of at least 20 centistokes at 25° C. This ingredient is present in an amount of 0.50 to 50 percent by weight.

The liquid polydimethylsiloxanes are well known articles of commerce available from numerous sources. They can be prepared by various techniques such as the hydrolysis and subsequent condensation of dimethyldihalosilanes, or by the cracking and subsequent condensation of dimethylcyclosiloxanes. The particular endblocking groups on the polydimethylsiloxanes is not critical. Generally speaking the commercially available materials are trimethylsilyl or hydroxyl endblocked, but other endblocked materials would work equally well. To obtain significant antifoam or defoam performance the viscosity of the polydimethylsiloxane must be at least 20 centistokes at 25° C. The upper viscosity limit of this component is not critical and can range up to 1,000,000 centistokes or more. Best results are believed to be obtained when the viscosity of the polydimethylsiloxane is in the range of 20 to 2000 centistokes at 25° C.

The third essential ingredient of the composition of this invention is silica. This ingredient is present in an amount of 0.05 to 5 percent by weight.

A silica aerogel is one kind to employ in the composition. Briefly, such materials are prepared by displacing water from a silica hydrogel with a low boiling organic liquid such as ethyl alcohol, heating the treated gel in an autoclave to approximately the critical temperature of the organic liquid, and then releasing the vapors of the organic liquid from the autoclave whereby excessive shrinking or crushing of the cellular structure of the silica is avoided. The details of this technique are described in the literature and silica aerogels are commercially available. Other silicas such as precipitated silicas, silica xerogels, fume silicas and treated silicas which have organosilyl groups on their surface can also be employed. These and other silicas which can be employed herein are well known and will be obvious to those skilled in the art.

The fourth essential ingredient of the composition of this invention is a siloxane resin. This ingredient is present in an amount of 0.01 to 0.40 percent by weight.

The siloxane resin employed in the composition is also a standard article of commerce available from various sources. It can be prepared by the cohydrolysis and condensation of $(CH_3)_3SiCl$ and $SiCl_4$ or by reacting $(CH_3)_3SiCl$ with an acidic silica sol. Its preparation is detailed in a host of places in the literature and therefore will not be set forth again here.

The fifth essential ingredient of the composition of this invention is a siloxane copolymer. Two types of siloxane copolymers have been found useful in the present invention. One of these copolymers consists essentially of $SiO_2$ units, $(CH_3)_3SiO_{1/2}$ units and $Q(CH_3)_2SiO_{1/2}$ units wherein Q is a polyoxypropylene polymer or a polyoxypropylene-polyoxyethylene copolymer radical having molecular weights in the range of 2000 to 6000, Q being attached to the silicon atom via a silicon-carbon bond, and the ratio of $SiO_2$ units to the toal $(CH_3)_3SiO_{1/2}$ and $Q(CH_3)_2SiO_{1/2}$ units is in the range of 1:0.4 to 1:1.2. The other operable copolymer is the reaction product of a mixture of a siloxane copolymer consisting essentially of $SiO_2$ units and $(CH_3)_3SiO_{1/2}$ units in which the ratio of the $SiO_2$ units to the $(CH_3)_3SiO_{1/2}$ units is in the range of 1:0.4 to 1:1.2, and a hydroxyl containing polyoxypropylene polymer or a hydroxyl polyoxypropylene-polyoxyethylene copolymer having molecular weights in the range of 2000 to 6000.

The first copolymer is best prepared by cohydrolyzing and condensing a mixture of $(CH_3)_3SiCl$, $H(CH_3)_2SiCl$ and $SiCl_4$ and then coupling an allyloxy-ended polyoxyalkylene polymer thereto with the aid of a platinum catalyst. For those unfamiliar with this preparation attention is directed to U.S. Pat. 3,511,788, particularly Examples 5 and 6, for details. The entire disclosure of this patent is incorporated herein by reference.

The second copolymer, which is preferred, is made simply by heating a mixture of the two ingredients for about two hours at reflux, preferably in the presence of a siloxane condensation catalyst such as potassium hydroxide or tin octoate. In this case it is theorized that the residual hydroxyl groups on the silicon atoms in the siloxane condense with the hydroxyl groups of the polyoxyalkylene polymer to form a silicon-oxygen-carbon bond between the two reactants.

Ingredients (4) and (5) as prepared generally contain a solvent such as xylene or toluene. These ingredients can be used as prepared or the solvent can be removed from the product before incorporation into the composition. Either way no difference in performance is known to occur. If the solvent is not removed before adding these ingredients, one less processing step is involved and the final product is more economically produced. The composition of this invention can contain, therefore, from 0 to 10 percent by weight of a solvent.

The composition of this invention can be prepared by simply blending or mixing the ingredients together in the proper proportions. The best method known at this time for preparing the compositions involves forming a mixture of ingredients (2), (3) and 4), then mixing in ingredients (1) and (5), and finally passing the resulting mixture through a colloid mill at a setting of less than 0.025 inch.

It has been found that the addition of up to 75 percent of a low molecular weight hydroxyl endblocked polydimethylsiloxane having a viscosity in the range of 30 to 100 centistokes, in lieu of ingredient (2), can improve the stability of water dilutions of the composition of this invention and also can improve its cold water stability.

The amount of the composition of this invention which is employed will depend on the particular system in which foam is to be controlled and the extent to which the user wishes to control the foam. While the composition of this invention can be used to control foam in a variety of systems exhibiting foam problems, it is particularly designed for and useful in jet dyeing processes. The compositions of this invention can be used as any kind of foam control agents, i.e., as defoaming agents and/or as antiforming agents. Defoaming agents are generally considered as foam reducers whereas antifoaming agents are generally considered as foam preventors. As noted, the instant compositions can serve in either or both capacities.

Now in order that those skilled in the art may better understand how the present invention can be practiced, the following examples are given by way of illustration and not by way of limitation. All parts and percents referred to herein are by weight, and all viscosities measured at 25° C., unless otherwise specified.

HOT ANTIFOAM PUMP TEST

This test was used in the following examples to evaluate the compositions of this invention. This test makes use of a motor driven pump (Eastern Industries Model B-1: style CZZ-71-ZV) which continually recirculates the foaming system. The foaming system is pumped into a stainless steel cylinder 7 inches high with a 5 inch diameter (2000 ml. capacity) where foam height is measured. A heating mantel is at the base of the cylinder to control the temperature. The antifoam is subjected to high amounts of agitation, emulsification, and chear in the test apparatus.

In this test 1000 ml. of a 0.1% Tween 80 (polyoxyethylene sorbitan monooleate) solution in water is placed in the pump test vessel. A 10% (solids solution of the composition to be tested in cold water is then prepared. The Tween 80 solution is heated in the pump test vessel to 150° F. and then a particular number of drops of the 10% solution of the composition being evaluated is added to the pump tester. When the test solution reaches 190° F. the tester is turned on. The bath is washed continuously for any signs of separation or plating out of components from the test composition. Ideally, there should be no separation or plating out whatsoever on the sides of the vessel during the first two minutes. Foam height and the time to reach that height is noted along with comments on performance.

Example 1

Fourteen compositions were prepared for evaluation as foam control agents. These compositions are set forth in Table I below. The compositions were prepared by mixing the ingredients and then passing the mixture through a colloid mill set at 0.20 inches.

Ingredient A is a siloxane glycol copolymer of the general formula $$Me_3Si(OSiMe_2)_{\sim 75}(OSiMeG)_{\sim 7}OSiMe_3$$

wherein G is $$-(CH_2)_3(OC_2H_4)_{\sim 24}(OC_3H_6)_{\sim 24}OOCCH_3$$

Ingredient B is a siloxane copolymer which is the reaction product of a copolymer consisting essentially of $SiO_2$ units and $(CH_3)_3SiO_{1/2}$ units, and a hydroxylated polyoxypropylene polymer. Ingredient B was prepared by mixing 215 g. of a 70% (solids) solution in xylene of a copolymer consisting essentially of $SiO_2$ units and $$(CH_3)_3SiO_{1/2}$$

units in which the ratio of the $SiO_2$ units to the $$(CH_3)_3SiO_{1/2}$$

units is in the range of 1:0.4 to 1:1.2, 150 g. of a hydroxylated polyoxypropylene polymer having a molecular weight of about 4100 (Voranol CP 4100), 300 g. of xylene, and 24 drops of 1 N alcoholic KOH. The foregoing mixture was refluxed for 70 minutes at 138° C., cooled to 70° C. and 3 g. of Filtrol 13 mixed in, mixing continued for 30 minutes, filtered, the xylene stripped off, and then the product diluted to 50% solids with isopropanol.

Ingredient C consists essentially of about 88% of a liquid polydimethylsiloxane having a viscosity of about 1000 centistokes at 25° C., about 10% of a precipitated silica, and about 2% of a 75% (solids) solution in xylene of a siloxane resin consisting essentially of $SiO_2$ units and $(CH_3)_3SiO_{1/2}$ units, the ratio of the $SiO_2$ units to the $(CH_3)_3SiO_{1/2}$ units being in the range of 1:0.4 to 1:1.2.

Ingredient D is a siloxane glycol copolymer of the general formula $$Me_3Si(OSiMe_2)_{\sim 10}(OSiMeG)_{\sim 3}OSiMe_3$$

wherein G is $$-(CH_2)_3O(C_2H_4O)_{\sim 12}H$$

TABLE I

| Test composition: | A | B | C | D | Drops used |
|---|---|---|---|---|---|
| 1 [1] | | | | | |
| 2 [2] | 100 | | | | 40 |
| 3 [2] | 50 | 50 | | | 20 |
| 4 | 94 | 5 | 1 | | 50 |
| 5 | 90 | 5 | 5 | | 75 |
| 6 | 90 | 5 | 3 | 2 | 50 |
| 7 | 92 | 5 | 1 | 2 | 50 |
| 8 | 88 | 5 | 5 | 2 | 50 |
| 9 | 92 | 3 | 3 | 2 | 50 |
| 10 | 94 | 3 | 1 | 2 | 50 |
| 11 | 90 | 3 | 5 | 2 | 50 |
| 12 | 88 | 7 | 3 | 2 | 50 |
| 13 | 86 | 7 | 5 | 2 | 50 |
| 14 | 88 | 5 | 3 | 4 | 50 |
| 15 | 86 | 5 | 5 | 4 | 50 |

[1] Control—no foam control agent included for comparison.
[2] Included for comparison.

The above compositions were evaluated in the hot antifoam pump test with the results indicated below being obtained.

Composition 1, that is the control without any foam control agent, took 15 seconds for the foam to reach a height of 3 inches.

Composition 2 took 5 minutes for the foam to reach a height of 1½ inches. Plating out of the composition began immediately after its addition.

Composition 3 took 5 minutes for the foam to reach a height of 1½ inches. Plating out of the composition began immediately after its addition. Formation of a scum on the surface was also noted.

Composition 4 took 3 minutes for the foam to reach a height of 2½ inches. No plating out of the composition occurred.

Composition 5 took 5 minutes for the foam to reach a height of 1½ inches. Very little plating out of the composition was noted.

Composition 6 took 30 seconds for the foam to reach a height of 1 inch and will run for more than 5 minutes without having the foam reach the top of the vessel. Performance is rated as excellent with no plating out being observed.

Composition 7 took 35 seconds for the foam to reach a height of 1 inch. A slight amount of plating out was noted, otherwise performance was good.

Composition 8 took 30 seconds for the foam to reach a height of 1 inch. No plating out was observed.

Compositions 9, 10 and 11 took 45, 20 and 35 seconds, respectively, for the foam to reach a height of 1 inch, and plating out of the composition occurred in each case.

Compositions 12, 13, 14 and 15 took 20, 25, 10 and 10 seconds, respectively, for the foam to reach a height of 1 inch. No plating out occurred with any of these compositions. However, the results from using these compositions do indicate that increasing amounts of siloxane glycol of the structure of ingredient D tend to increase stability of the composition while having a slightly deleterious effect on performance.

Example 2

Five compositions were prepared for evaluation as foam control agents following the procedures of Example 1 except that ingredient B was a reaction product in which the ratio of the siloxane copolymer and polyoxypropylene polymer was 1:2 instead of 1:1. These compositions are set forth in Table II below. Fifty drops of these compositions were employed in the hot antifoam pump test.

TABLE II

| Test composition: | A | B | C | D |
|---|---|---|---|---|
| 1 | 88 | 5 | 5 | 2 |
| 2 | 85.5 | 7.5 | 5 | 2 |
| 3 | 92 | 5 | 1 | 2 |
| 4 | 94 | 3 | 1 | 2 |
| 5 [1] | 95 | | 3 | 2 |

[1] Included for comparison.

All five compositions exhibited good foam control performance. Compositions 1–4 did not separate or plate out during use whereas composition 5 was observed to plate out.

Example 3

A mixture of 16.7 parts of a siloxane copolymer consisting essentially of $SiO_2$ units and $(CH_3)_3SiO_{1/2}$ units in the ratio of 1:0.4 to 1:1.2, 33.3 parts of the hydroxylated polyoxypropylene polymer of Example 1, and 50 parts of xylene was refluxed for about two hours in the presence of stannous octoate to a xylene solution of the reaction product of the two ingredients. A composition was prepared by mixing 5% of the above prepared solution with 90% of ingredient A, 3% of ingredient C, and 2% of ingredient D, and then colloid milling the resulting mixture at 0.15 inch. Ingredients A, C and D are as described in Example 1. This composition was evaluated in the hot antifoam pump test. When 20 drops were used the foam was over the top of the vessel in 45 seconds whereas when 30 drops were used the foam height did not exceed 2 inches. No plating out occurred in either case.

Example 4

A composition was prepared as in Example 2 except that is consisted essentially of 83% A, 10% B, 5% C and 2% D. When evaluated in the hot antifoam pump test using 50 drops, good performance and no plating out is observed.

Example 5

A composition identical to composition 3 of Example 2 was prepared and then diluted to 10% solids with water. Then 1 g., 2 g., 3 g., and 5 g. of this diluted composition was evaluated in the hot antifoam pump test. These amounts gave 100, 200, 300 and 500 parts per million (p.p.m.) of antifoam solids, respectively.

At the 100 p.p.m. level of use the foam height after two minutes was 2 inches and after four more minutes was still 2 inches. After the pump was stopped 45 seconds was required for the foam to break and the solution to become clear.

At the 200 p.p.m. level of use the foam height after two minutes was 1½ inches and after four more minutes was 1¾ inches. After the pump was stopped 10 seconds was required for the foam to break and the solution to become clear.

At the 300 p.p.m. level of use the foam height after two minutes was 1⅛ inches and after four more minutes was 1 inch. After the pump was stopped 60 seconds was required for the foam to break and the solution to become clear.

At the 500 p.p.m. level of use the foam height after two minutes was ⅞ inch and after four more minutes was ⅞ inch. After the pump was stopped 4 seconds was required for the foam to break and the solution to become clear.

At all levels a slight separation of the antifoam was noted.

Example 6

A composition was prepared by mixing (A) 25 g. of a siloxane copolymer which is the reaction product derived by heating a mixture of 1 part of a siloxane copolymer consisting essentially of $SiO_2$ units and $(CH_3)_3SiO_{1/2}$ units in which the ratio of the $SiO_2$ units to the $(CH_3)_3SiO_{1/2}$ units is in the range of 1:0.4 to 1:1.2, and 2.5 parts of a hydroxylated polyoxypropylene polymer having a molecular weight of about 3800 (Voranol CP3810); (B) 5 g. of a composition which consists essentially of about 88% of a liquid polydimethylsiloxane having a viscosity of 1000 centistokes at 25° C., about 10% of precipitated silica, and about 2% of a siloxane resin consisting essentially of $SiO_2$ units and $(CH_3)_3SiO_{1/2}$ units in which the ratio of the $SiO_2$ units to the $(CH_3)_3SiO_{1/2}$ units is in the range of 1:0.4 to 1:1.2; (C) 460 g. of a siloxane glycol copolymer having the general formula $$Me_3Si(OSiMe_2)_{\sim 75}(OSiMeG)_{\sim 7}OSiMe_3$$

wherein G is

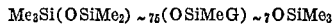

and (D) 10 g. of a siloxane glycol copolymer having the general formula $$Me_3Si(OSiMe_2)_{\sim 10}(OSiMeG)_{\sim 3}OSiMe_3$$

wherein G is

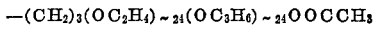

The order of mixing was as the ingredients are listed above.

A second composition was prepared which was identical to the first except that the ingredients were mixed in the order (C), (A), (B), (D). Both compositions were passed through a colloid mill at 0.015 inch.

At a 200 p.p.m. concentration in the hot antifoam pump test the first composition had a foam height of 1¾ inches after two minutes and 1⅞ inches after a total of six minutes. The second composition at a 200 p.p.m. concentration in the hot antifoam pump test had a foam height of 1½ inches after two minutes and 1⅝ inches after a total of six minutes.

After the pump was stopped with the first composition the foam broke in 10 seconds and a water spot showed in 25 seconds whereas with the second composition the foam broke in 4 seconds and a water spot showed in 14 seconds.

Example 7

25 g. of a siloxane copolymer which was identical to the reaction product ingredient B of Example 2 was dissolved in 350 g. of a siloxane glycol copolymer identical to ingredient A of Example 1. Then 50 g. of a hydroxyl endblocked polydimethylsiloxane having a viscosity of about 80 centistokes at 25° C. was dissolved in 75 g. of a composition identical to ingredient C of Example 1. The second prepared solution was then added to the first one and the resulting mixture heated to 75° C. with stirring, cooled to 35° C. and then passed through a colloid mill at 0.015 inch. At a 200 p.p.m. level in the hot antifoam pump test the foam height was ⅞ inch after two minutes and about ⅝ inch after a total of six minutes. No separation of the composition was noted. After the pump was stopped the foam broke in 3 seconds.

Example 8

When the following siloxane glycol copolymer is substituted for ingredient A of Example 1, similar results are obtained.

(1)  $MeSi\{(OSiMe_2)_{120}(OSiMeG)_{10}OSiMe_2G\}_3$ wherein G is $-(CH_2)_4(OC_2H_4)_{50}(OC_3H_6)_{50}OC_4H_9$ (2)  $Si\{(OSiMe_2)_{96}(OSiMeG)_8OSiMe_3\}_4$ wherein G is $-(CH_2)_6(OC_2H_4)_{30}(OC_3H_6)_{25}$
$(OC_4H_8)_5OCH_3$ (3)  $GMe_2Si(OSiMe_2)_{120}(OSiMeG)_8OSiMe_2G$ wherein G is $-(CH_2)_3(OC_2H_4)_{15}(OC_3H_6)_{30}OOCCH_3$ (4)  $Me_3Si(OSiMe_2)_{750}(OSiMeG)_{50}OSiMe_3$ where G is $-(CH_2)_3(OC_2H_4)_{35}(OC_3H_6)_{25}OOCH_3$

Example 9

When there is substituted for ingredient B of Example 1 a siloxane copolymer consisting essentially of $SiO_2$ units $(CH_3)_3SiO_{1/2}$ units and $Q(CH_3)_2SiO_{1/2}$ units, wherein Q is a polyoxypropylene-polyoxyethylene copolymer having a molecular weight of about 2000 and is attached to the silicon atom via a silicon-carbon bond, and the ratio of the $SiO_2$ units to the total $(CH_3)_3SiO_{1/2}$ and $Q(CH_3)_2SiO_{1/2}$ units is in the range of 1:0.4 to 1:1.2, similar results are obtained.

That which is claimed is:
1. A composition which consists essentially of
(1) 40 to 98.94 percent by weight of a siloxane glycol copolymer selected from the group consisting of siloxane glycol copolymers having the general formulae
   (a) $R_aSi\{(OSiMe_2)_n(OSiMeG)_bOSiMe_2G\}_{4-a}$
   (b) $R_aSi\{(OSiMe_2)_n(OSiMeG)_cOSiMe_3\}_{4-a}$,
   (c) $GMe_2Si(OSiMe_2)_n(OSiMeG)_bOSiMe_2G$, and
   (d) $Me_3Si(OSiMe_2)_n(OSiMeG)_cOSiMe_3$
in which formulae
R is a hydrocarbon radical free of aliphatic unsaturation and contains from 1 to 10 carbon atoms,
Me is a methyl radical,
G is a radical of the structure $-D(OR')_mA$ wherein
   D is an alkylene radical containing from 1 to 30 carbon atoms,
   R' is an alkylene radical containing from 2 to 10 carbon atoms,
   $m$ has a value of at least 1, and
   A is a capping group,
$a$ has a value of 0 or 1,
$n$ has a value of at least 12, b has a value of 0 to 50, and
c has a value of 1 to 50,
(2) 0.50 to 50 percent by weight of a liquid polydimethylsiloxane having a viscosity of at least 20 centistokes at 25° C.,
(3) 0.05 to 5 percent by weight of silica,
(4) 0.01 to 0.40 percent by weight of a siloxane resin consisting essentially of $SiO_2$ units and $(CH_3)_3SiO_{1/2}$ units, $(CH_3)_3SiO_{1/2}$ units and $Q(CH_3)_2SiO_{1/2}$ units being in the range of 1:0.4 to 1:1.2, and
(5) 0.50 to 10 percent by weight of a siloxane copolymer selected from the group consisting of
  (i) copolymers consisting essentially of $SiO_2$ units, $(CH_3)_3SiO_{1/2}$ units and $Q(CH_3)_2SiO_{1/2}$ units wherein Q represents a polyoxypropylene polymer or a polyoxypropylene-polyoxyethylene copolymer radical having a molecular weight in the range of 2000 to 6000, Q being attached to the silicon atom via a silicon-carbon bond, the ratio of the $SiO_2$ units to the total $(CH_3)_3SiO_{1/2}$ and $Q(CH_3)_2SiO_{1/2}$ units being in range of 1:0.4 to 1:1.2, and
  (ii) copolymers which are the reaction products derived from heating a mixture of a siloxane copolymer consisting essentially of $SiO_2$ units and $(CH_3)_3SiO_{1/2}$ units in which the ratio of the $SiO_2$ units to the $(CH_3)_3SiO_{1/2}$ units is in the range of 1:0.4 to 1:1.2, and a hydroxylated polyoxypropylene polymer or a hydroxylated polyoxypropylene - polyoxyethylene copolymer having molecular weights in the range of 2000 to 6000.

2. A composition as defined in claim 1 wherein the siloxane glycol copolymer (1) has the General Formula d, the liquid polydimethylsiloxane (2) has a viscosity in the range of 20 to 2000 centistokes, the silica (3) is a precipitated silica, and the siloxane copolymer (5) is a reaction product (ii).

3. A composition as defined in claim 1 which contains from 0 to 10 percent by weight of a solvent.

4. A composition as defined in claim 1 in which up to 75 percent by weight of (2) is replaced by a hydroxyl endblocked polydimethylsiloxane having a viscosity in the range of 30 to 100 centistokes.

5. A composition as defined in claim 2 wherein the siloxane glycol copolymer (1) is a mixture of at least two siloxane glycol copolymers having the General Formula d.

6. A composition as defined in claim 2 wherein (1) has the General Formula

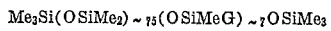

wherein G is

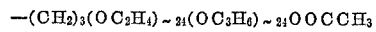

and (5) is prepared from a hydroxylated polyoxypropylene polymer.

7. A composition as defined in claim 5 which consists essentially of (1) about 94.5 percent of a siloxane glycol copolymer of the general formula

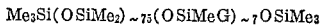

wherein G is

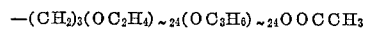

and about 2 percent of a siloxane glycol copolymer of the general formula

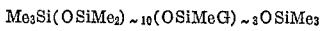

wherein G is

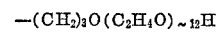

(2) about 0.9 percent of the liquid polydimethylsiloxane, (3) about 0.01 of the precipitated silica, (4) about 0.015 percent of the siloxane resin, and (5) about 2.6 percent of the siloxane copolymer which is prepared from a hydroxylated polyoxypropylene polymer.

8. In a process of controlling foam which includes the addition of a foam control agent to the system in which the foaming is to be controlled, the improvement comprising using the composition of claim 1 as the foam control agent.

9. A process as defined in claim 8 which is a jet dyeing process.

10. A process as defined in claim 9 wherein a composition as defined in claim 7 is employed as the foam control agent.

References Cited
UNITED STATES PATENTS
3,409,510  11/1968  LeMaster et al. ----- 252—321

JOHN D. WELSH, Primary Examiner

U.S. Cl. X.R.
252—358; 8—DIG. 1

UNITED STATES PATENT AND TRADEMARK OFFICE
CERTIFICATE OF CORRECTION

PATENT NO. : 3,746,653
DATED : July 17, 1973
INVENTOR(S) : John W. Churchfield

It is certified that error appears in the above-identified patent and that said Letters Patent are hereby corrected as shown below:

Column 8, line 39, the formula "$-(CH_2)_3(OC_2H_4)_{35}(OC_3H_6)_{25}OOCH_3$" should read ---$(CH_2)_3(OC_2H_4)_{25}(OC_3H_6)_{25}OOCCH_3$--.

Column 9, line 9, after the word "units" insert --the ratio of the $SiO_2$ units to the--.

Column 9, line 9, delete "and $Q(CH_3)_2SiO_{1/2}$".

Column 9, line 10, delete "units".

Column 9, line 47, "General Formula" should read --general formula--.

Column 10, line 2, "General Formula" should read --general formula--.

Signed and Sealed this

Twelfth Day of October 1976

[SEAL]

Attest:

RUTH C. MASON
Attesting Officer

C. MARSHALL DANN
Commissioner of Patents and Trademarks